(12) United States Patent
Haar et al.

(10) Patent No.: US 9,650,088 B2
(45) Date of Patent: May 16, 2017

(54) WORK VEHICLE

(71) Applicant: CNH AMERICA LLC, New Holland, PA (US)

(72) Inventors: William Ryan Haar, Valley Center, KS (US); Curtiss M. Lee, Garden Plains, KS (US); Jason J. Bergkamp, Mount Hope, KS (US); William A. Wright, Richfield, WI (US)

(73) Assignee: CNH Industrial America LLC, New Holland, PA (US)

( * ) Notice: Subject to any disclaimer, the term of this patent is extended or adjusted under 35 U.S.C. 154(b) by 649 days.

(21) Appl. No.: 14/013,085

(22) Filed: Aug. 29, 2013

(65) Prior Publication Data

US 2014/0158440 A1 Jun. 12, 2014

Related U.S. Application Data

(60) Provisional application No. 61/733,953, filed on Dec. 6, 2012.

(51) Int. Cl.
*B62D 55/04* (2006.01)

(52) U.S. Cl.
CPC .......... *B62D 55/04* (2013.01); *F16N 2210/33* (2013.01)

(58) Field of Classification Search
CPC ....................................................... B62D 55/04
See application file for complete search history.

(56) References Cited

U.S. PATENT DOCUMENTS

| 3,810,517 A * | 5/1974 | Hurlburt | B60K 17/342 180/246 |
| 3,976,154 A * | 8/1976 | Clark | B60K 17/36 180/24.05 |
| 4,074,782 A * | 2/1978 | Bauer | B62D 11/183 180/6.48 |
| 4,782,906 A * | 11/1988 | Kole | B60K 17/358 180/23 |
| 4,955,455 A * | 9/1990 | Albright | B60K 11/00 180/291 |
| 4,962,821 A * | 10/1990 | Kim | B60K 17/14 180/242 |
| 4,962,825 A * | 10/1990 | Albright | B60K 11/00 180/292 |
| 4,966,242 A * | 10/1990 | Baillargeon | B62D 55/0655 180/242 |
| 5,290,201 A * | 3/1994 | Tesker | A01D 41/02 180/24.11 |
| 5,964,567 A * | 10/1999 | Bamford | B60K 17/04 180/6.2 |
| 6,036,611 A * | 3/2000 | Bigo | B60K 17/36 474/146 |

(Continued)

*Primary Examiner* — J. Allen Shriver, II
*Assistant Examiner* — Travis Coolman
(74) *Attorney, Agent, or Firm* — Peter K. Zacharias; Patrick M. Sheldrake

(57) ABSTRACT

A work vehicle includes a frame having opposed compartments to receive a lubricating liquid for providing lubrication to a corresponding motor-powered chain drive. The chain drive is usable to drivingly move a continuous track or a set of wheels for moving the work vehicle. The continuous track and the set of wheels are interchangeably receivable by the frame, the frame remaining virtually identical whether receiving the continuous track or the set of wheels.

13 Claims, 3 Drawing Sheets

(56) References Cited

U.S. PATENT DOCUMENTS

| | | | |
|---|---|---|---|
| 6,108,907 A | 8/2000 | Anderson et al. | |
| 6,513,614 B2 | 2/2003 | Knutson et al. | |
| 6,742,619 B2 * | 6/2004 | Farbotnik | B62D 24/02 180/299 |
| 7,000,724 B2 | 2/2006 | Lamela et al. | |
| 7,044,258 B2 * | 5/2006 | Lamela | B60K 17/04 180/242 |
| 7,111,697 B2 * | 9/2006 | Brazier | A01G 25/09 180/9.1 |
| 7,198,121 B2 * | 4/2007 | Lamela | B60K 17/342 180/6.48 |
| 7,255,184 B2 * | 8/2007 | Loegering | B62D 55/084 180/9.21 |
| 7,798,260 B2 * | 9/2010 | Albright | B62D 33/0604 180/6.7 |
| 7,815,000 B2 | 10/2010 | Kisse et al. | |
| 7,921,942 B2 * | 4/2011 | Schafer | B60K 17/26 180/9.21 |
| 8,016,065 B2 * | 9/2011 | Osborn | B60K 1/02 180/233 |
| 8,056,662 B2 * | 11/2011 | Schoon | B60K 1/02 180/245 |
| 8,146,700 B2 * | 4/2012 | Rousseau | B66F 9/22 180/242 |
| 8,327,969 B2 * | 12/2012 | Rousseau | B66F 9/22 180/246 |
| 8,794,358 B2 * | 8/2014 | Hansen | B62D 55/04 180/9.21 |
| 8,801,115 B2 * | 8/2014 | Hansen | B62D 55/04 180/9.21 |
| 2003/0205424 A1 | 11/2003 | Felsing et al. | |
| 2004/0124030 A1 * | 7/2004 | Lamela | B60K 17/04 180/305 |
| 2005/0145422 A1 * | 7/2005 | Loegering | B62D 55/084 180/9.26 |
| 2006/0232130 A1 * | 10/2006 | Hansen | B62D 55/04 305/200 |
| 2008/0264054 A1 * | 10/2008 | Rousseau | B60K 17/105 60/484 |
| 2010/0012399 A1 | 1/2010 | Hansen | |
| 2010/0060075 A1 * | 3/2010 | Hansen | B62D 55/04 305/15 |
| 2010/0147631 A1 * | 6/2010 | Rousseau | B66F 9/22 187/250 |
| 2011/0108332 A1 * | 5/2011 | Gleasman | B62D 55/125 180/6.7 |

* cited by examiner

WORK VEHICLE

FIELD OF THE INVENTION

The present invention relates generally to the field of work vehicles. It relates more particularly to work vehicles having wheels or tracks for driven movement.

BACKGROUND OF THE INVENTION

Work vehicles, such as skid steer loaders, may be configured with either an opposed pair of wheels or wheel drive system or opposed track drive system to drivingly move the work vehicle. Conventional work vehicle constructions involve dedicated units having distinctly different frames, depending upon whether a track drive system or a wheel drive system is to be incorporated into the work vehicle. Requiring different frames increases inventory and cost, not only for maintaining different frame constructions, but also maintaining the different structural and fluid drive components for use with a different frames. In addition, there is a reduction of manufacturing flexibility associated with accommodating change orders, such as a customer requesting a change in the drive system (e.g., between a track drive system and a wheel drive system).

Accordingly, it would be advantageous to have a work vehicle configurable between a wheel drive system and a track drive system without the above-mentioned disadvantages.

SUMMARY OF THE INVENTION

The present invention relates to a work vehicle includes a frame having opposed compartments to receive a lubricating liquid for providing lubrication to a corresponding motor-powered chain drive. The chain drive is usable to drivingly move a continuous track or a set of wheels for moving the work vehicle. The continuous track and the set of wheels are interchangeably receivable by the frame, the frame remaining virtually identical whether receiving the continuous track or the set of wheels.

The present invention further relates to a work vehicle including a frame having opposed compartments to receive a lubricating liquid for providing lubrication to a corresponding chain drive powered by a hydraulic motor. The chain drive is usable to drivingly move a continuous track or a set of wheels for moving the work vehicle. Fluid lines to the hydraulic motor remain interior of the frame when either of the continuous track or the set of wheels are received by the frame. The continuous track and the set of wheels are interchangeably receivable by the frame, the frame remaining virtually identical whether receiving the continuous track or the set of wheels.

The present invention further relates to a work vehicle including a frame having opposed compartments to receive a lubricating liquid for providing lubrication to a corresponding chain drive powered by a hydraulic motor. The chain drive is usable to drivingly move a continuous track or a set of wheels for moving the work vehicle. Fluid lines to the hydraulic motor remain interior of the frame when either of the continuous track or the set of wheels are received by the frame, the fluid lines being identical whether the continuous track or the set of wheels is received by the frame. The continuous track and the set of wheels are interchangeably receivable by the frame, the frame remaining virtually identical whether receiving the continuous track or the set of wheels.

An advantage of the present invention is enhanced flexibility relative to manufacturing a work vehicle whether a wheel system or a track system is selected for drivingly moving the work vehicle.

A further advantage of the present invention is reduced inventory costs as a single work vehicle construction is usable irrespective a wheel drive or a track drive is selected.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
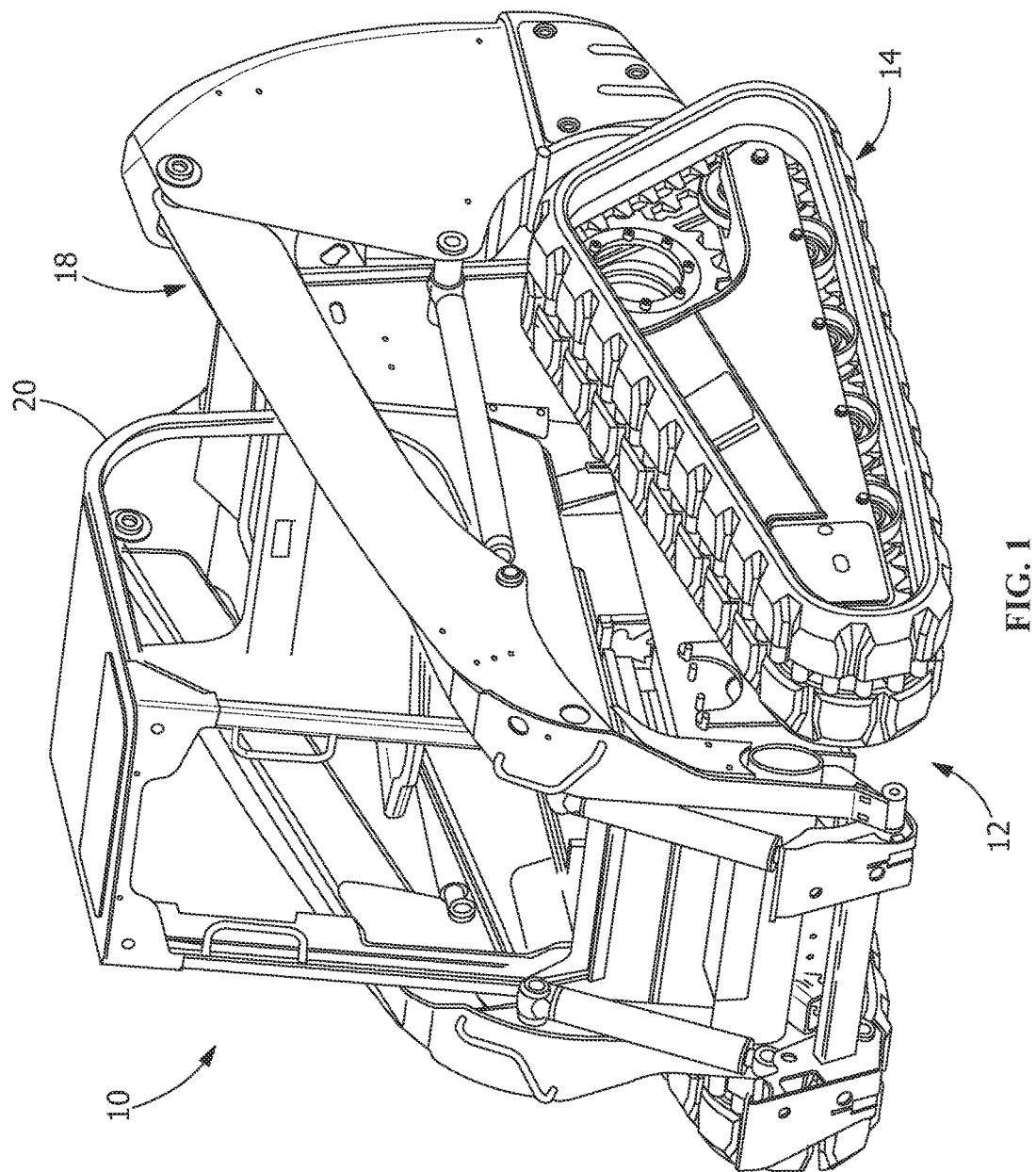
FIG. 1 is an upper perspective view of an embodiment of a work vehicle of the present invention.
Figure 2:
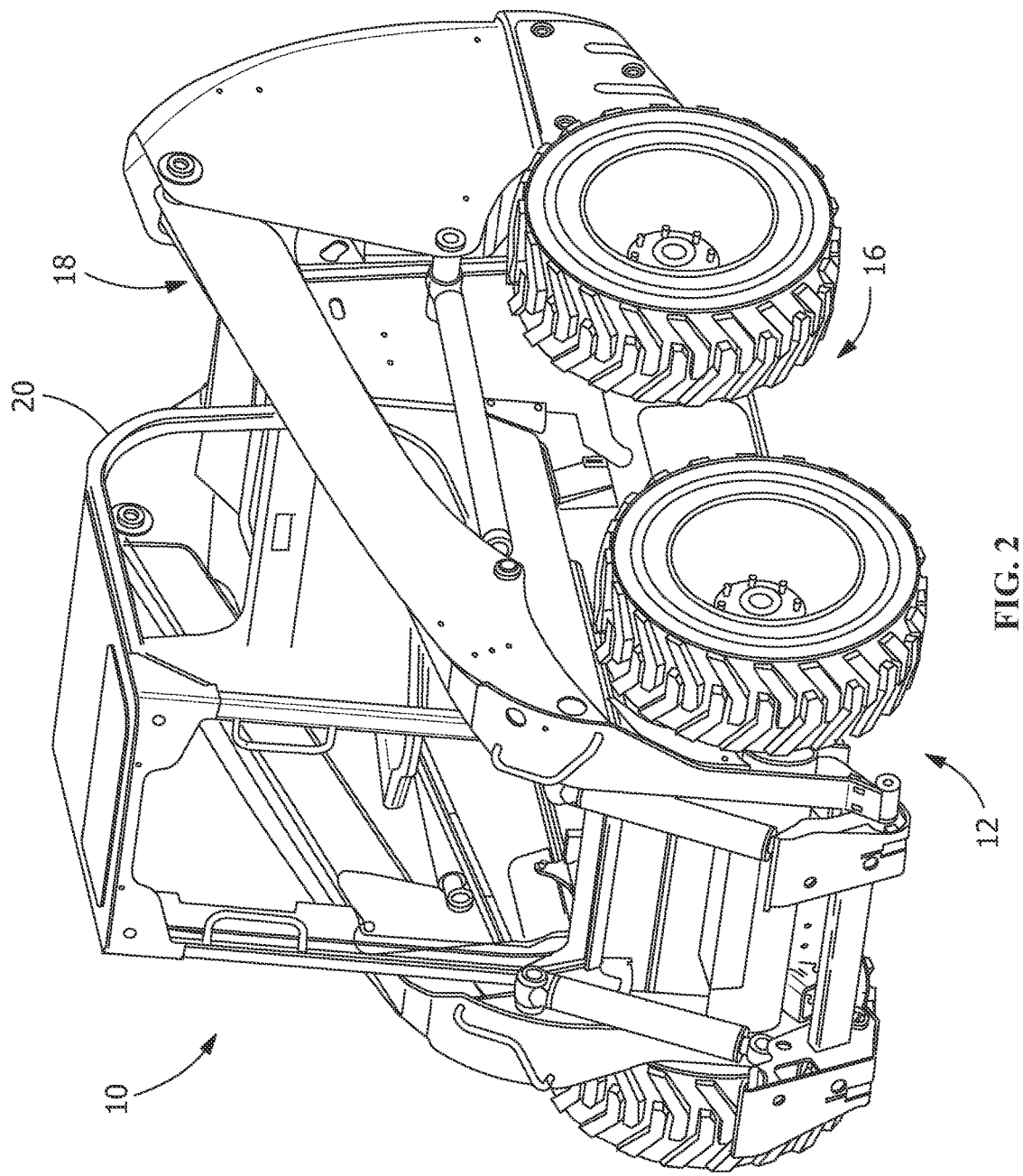
FIG. 2 is upper perspective view of an embodiment of a work vehicle of the present invention.

FIG. 1 shows an exemplary work vehicle 10 provided with a frame 12 that rotatably supports a plurality or set of wheels 14 positioned along opposed sides of work vehicle 10, such as a pair of wheels for drivingly moving work vehicle 10. FIG. 2 shows an exemplary work vehicle 10 provided with a frame 12 that movingly supports a continuous track 16 positioned along opposed sides 20, 22 (FIG. 2) of work vehicle 10 for drivingly moving work vehicle 10. A lifting structure 18 includes an arrangement of structural members and actuators controllable by an operator to manipulate an implement (not shown) to perform work. Frame 12 structurally supports a cab structure 21 to surround and protect the operator. In addition, as will be discussed in further detail below, frame 12 remains virtually identical whether receiving continuous track 16 or set of wheels 14. That is, frame 12 can interchangeably receive continuous track 16 or set of wheels 14 while utilizing substantially similar components, resulting in a reduction of inventory, as well as significantly increased manufacturing flexibility associated with accommodating change orders, such as a customer requesting a change in the drive system (e.g., between a continuous track 16 and a set of wheels 14).

Figure 3:
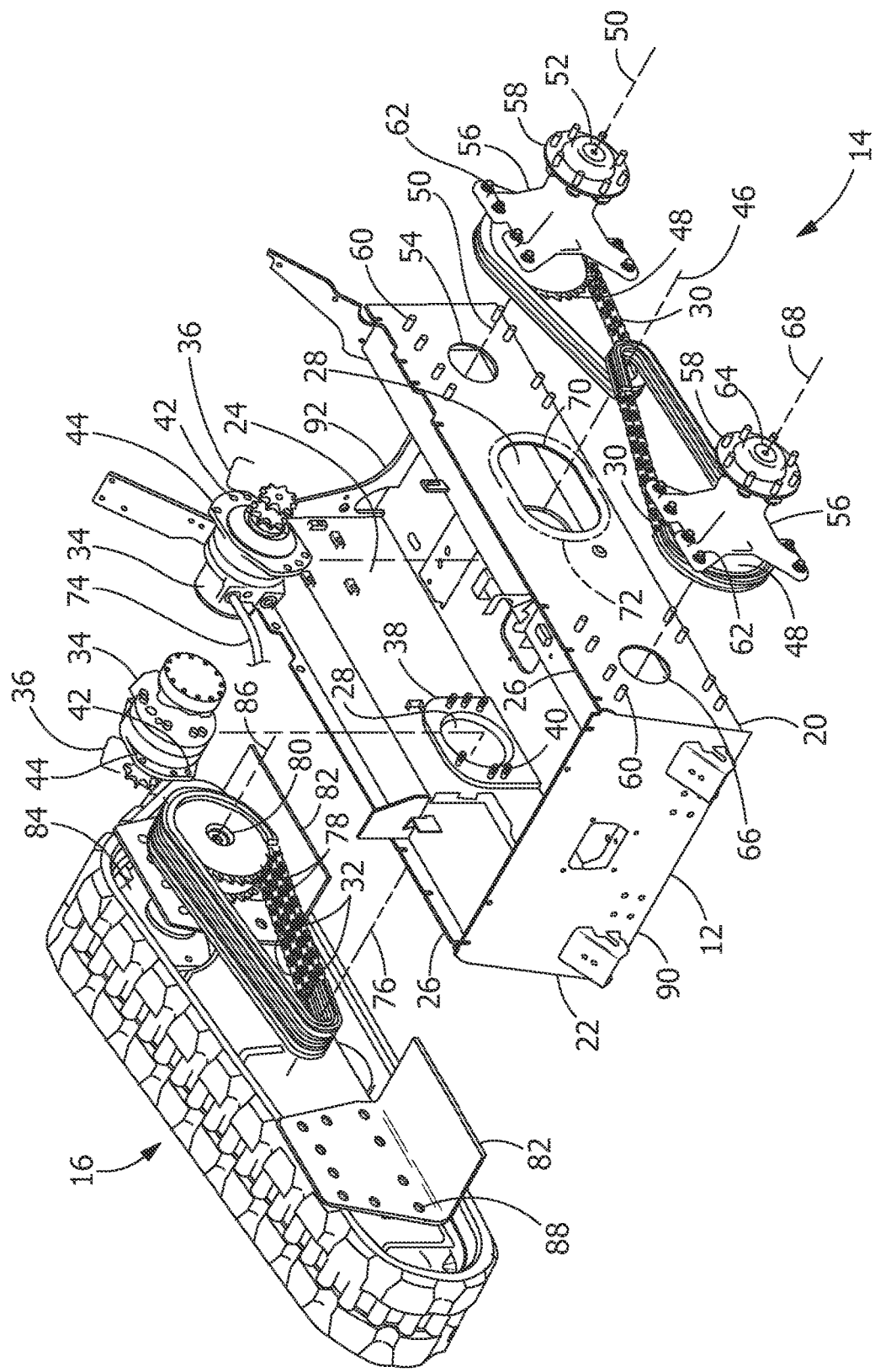
FIG. 3 is an exploded cutaway view of an embodiment of a work vehicle frame configurable between a wheel system and a track system according to the present invention.

FIG. 3 shows an exploded cutaway view of frame 12 of work vehicle 10. FIG. 3 further shows side 20 configured to receive set of wheels 14 (wheels not shown in FIG. 2) and opposed side 22 configured to receive continuous track 16. In one embodiment, as shown in FIG. 3, the work vehicle may be configured to receive a continuous track 16 on one side of the work vehicle and a set of wheels 14 on the opposed side of the work vehicle. Each of opposed sides 20, 22 include an inner panel 24 spaced apart from an outer panel 26, forming respective compartments 28 therebetween. As further shown in FIG. 3, compartments 28 are each configured to receive a pair of chain drives 30, 32 driven or powered by a motor 34 having a pair of drive sprockets or drive gears 36. Motor 34 can be an electrical motor, hydraulic motor, mechanical linkage, such as from an internal combustion engine or other suitable construction capable of drivingly moving chain drives 30, 32 for moving work vehicle 10. Compartment 28 can be configured to be substantially fluid tight for receiving a lubricating liquid, such as oil or other suitable liquid or source of lubrication for providing lubrication to a corresponding motor-powered chain drive 30, 32.

As further shown in FIG. 3, each inner panel 24 includes a doubler plate 38 having an outwardly extending arrangement of fasteners 40 configured to receive a corresponding arrangement of apertures 42 formed in one or more flanges 44 protruding from the body of motor 34. As further shown in FIG. 3, upon assembly, drive gears 36 of motor 34 associated with side 20 are secured within compartment 28, rotating about axis 46 and drivingly engaging chain drive 30 and corresponding idler sprockets or idler gears 48 also secured within compartment 28. One idler gear 48 is secured to an axle 52 extending through an opening 54 formed in outer panel 26, then through a hub support 56 and secured to a wheel hub 58. Hub support 56 is secured to outer panel 26 by arranged fasteners 60, such as studs that extend through corresponding openings formed in hub support 56, which fasteners 60 including mating fasteners 62, such as nuts. Collectively, idler gear 48, axle 52 and wheel hub 58 are urged into driven rotational movement about axis 50 by one of drive gears 36 of motor 34. That is, idler sprocket or idler gear 48 that rotates about axis 50 becomes a drive axle for a wheel of the set of wheels 14 and is in close proximity to an end 92 of frame 12.

Similarly, the other idler gear 48 in compartment 28 and adjacent to side 20 is secured to an axle 64 extending through an opening 66 formed in outer panel 26, then through a hub support 56 and secured to a wheel hub 58. Hub support 56 is secured to outer panel 26 by arranged fasteners 60, such as studs that extend through corresponding openings formed in hub support 56, which fasteners 60 including mating fasteners 62, such as nuts. Collectively, idler gear 48, axle 64 and wheel hub 58 are urged into driven rotational movement about axis 68 by one of drive gears 36 of motor 34. In one embodiment, axis 46 is equidistant from axes 50, 68, permitting each chain of chain drive 30 to be of equal length or identical to each other. That is, idler sprocket or idler gear 48 that rotates about axis 68 becomes a drive axle for a wheel of the set of wheels 14 and is in close proximity to an end 90 of frame 12.

In one embodiment, idler gears 78, 48 may be identical.

It is to be understood that the terms drive gears, drive sprockets, and the like may be used interchangeably. It is also to be understood that the terms idler gears, idler sprockets, and the like may be used interchangeably. It is to be further understood that the terms of gears and sprockets, and the like may be used interchangeably.

A cover 72 secured over an opening 70 formed in outer panel 26 permits access to components rotating about axis 46.

As further shown in FIG. 3, each inner panel 24 includes a doubler plate 38 having an outwardly extending arrangement of fasteners 40 configured to receive a corresponding arrangement of apertures 42 formed in one or more flanges 44 protruding from the body of motor 34. As further shown in FIG. 3, upon assembly, drive gears 36 of motor 34 associated with side 22 for a continuous track 16 are secured within compartment 28, rotating about axis 76 and drivingly engaging chain drive 32 and corresponding idler sprockets or idler gears 78 also secured within compartment 28. Idler gears 78 are secured to an axle 80 extending through an opening formed in outer panel 26 (not shown in FIG. 3, but analogous to opening 54 formed in outer panel 26 on side 20), then through a bracket 82 and secured to an idler sprocket or idler gear 84 positioned exterior of frame 12 and in meshing contact with continuous track 16. That is, idler sprocket or idler gear 84 that rotates about axis 86 becomes a drive axle for continuous track 16 and is in close proximity to an end 92 of frame 12. Bracket 82 is secured to outer panel 26 by arranged fasteners (not shown in FIG. 3, but analogous to fasteners 60 such as studs that extend through corresponding openings formed in hub support 56 of side 20 and mating fasteners 62 such as nuts). Collectively, idler gears 78, axle 80 and idler gear 84 are urged into driven rotational movement about axis 86 by corresponding drive gears 36 of motor 34. Since both idler gears 78 rotate about the same axis 86, there is no need for the opening formed through outer panel 26 and analogous to opening 66 on side 22 However, bracket 82 includes openings 88 arranged to receive fasteners 60 such as studs extending outwardly from outer panel 26, as well as mating fasteners 62 such as nuts configured to receive the studs and draw bracket 82 into fluid tight contact with outer panel 26. As required, gasket material (not shown) or other material, such as caulking required to effect the fluid tight seal or fluid tight contact can be used.

In one embodiment, in which the respective distances between axis 46 and axes 50, 68 and between axis 76 and axis 86 are substantially the same, drive chains 30, 32 can be the same or identical to each other. It is to be understood that even if the respective distances between axis 46 and axes 50, 68 and between axis 76 and axis 86 are substantially the same, drive chains 30, 32 would be different from each other if the ratio of the sprockets associated with driving the set of wheels 14 (FIG. 2) is different that the ratio of sprockets associated with driving the continuous track 16 (FIG. 1).

Hydraulic fluid lines, such as hydraulic fluid line or fluid line 74 extend interior of frame 12, whether associated with continuous track 16 or set of wheels 14 received by frame 12. Such an arrangement increases fluid line service life, and providing a more reliable fluid system construction. In one embodiment, fluid lines are identical whether associated with continuous track 16 or set of wheels 14 received by frame 12.

By virtue of the arrangement shown in FIG. 3, it can be appreciated by one having ordinary skill in the art that upon frame 12 receiving continuous track 16 that is assembled to frame 12, at a time subsequent to such assembly, continuous track 16 can be replaced by set of wheels 14, and including axles 52, 64. Conversely, it can further be appreciated by one having ordinary skill in the art that upon frame 12 receiving set of wheels 14 and including axles 52, 64 that is assembled to frame 12, at a time subsequent to such assembly, set of wheels 14 and axles 52, 64 can be replaced by continuous track 16.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
a frame having two opposed compartments, wherein each compartment of the two opposed compartments is configured to receive a lubricating liquid to provide lubrication to a respective chain drive, the chain drive is usable to drivingly move a continuous track or a set of wheels to move the work vehicle, the continuous track and the set of wheels are interchangeably receivable by the frame, and the frame remains virtually identical whether receiving the continuous track or the set of wheels; and
a motor having a first drive gear and a second drive gear;
wherein a first chain of the respective chain drive extends between the first drive gear and a first sprocket coupled to a first wheel drive axle positioned proximate to a first longitudinal end of the frame, and a second chain of the respective chain drive extends between the second drive gear and a second sprocket coupled to a second wheel drive axle positioned proximate to a second longitudinal end of the frame, opposite the first longitudinal end of the frame, while the set of wheels is received by the frame; and
wherein at least one chain of the respective chain drive extends between the first drive gear and a third sprocket coupled to a track drive axle positioned proximate to the first longitudinal end of the frame, and the at least one chain of the respective chain drive extends between the second drive gear and a fourth sprocket coupled to the track drive axle, while the continuous track is received by the frame.

2. The work vehicle of claim 1, wherein the motor comprises one of an electrical linkage, a hydraulic linkage, and a mechanical linkage from an internal combustion engine.

3. The work vehicle of claim 1, wherein the at least one chain of the respective chain drive comprises the first chain and the second chain.

4. The work vehicle of claim 1, wherein the first, second, third, and fourth sprockets are substantially identical to one another.

5. The work vehicle of claim 1, wherein upon the frame receiving the continuous track and being assembled to the frame, subsequently, the continuous track is replaceable with the set of wheels.

6. The work vehicle of claim 1, wherein upon the frame receiving the set of wheels and being assembled to the frame, subsequently, the set of wheels is replaceable with the continuous track.

7. The work vehicle of claim 1, comprising a first plurality of fasteners extending laterally outwardly from a lateral side of the frame proximate to the first longitudinal end of the frame, and a second plurality of fasteners extending laterally outwardly from the lateral side of the frame proximate to the second longitudinal end of the frame;
wherein the first plurality of fasteners is configured to couple a first hub support to the frame while the set of wheels is received by the frame, and the second plurality of fasteners is configured to couple a second hub support to the frame while the set of wheels is received by the frame; and
wherein the first plurality of fasteners is configured to couple a first bracket to the frame while the continuous track is received by the frame, and the second plurality of fasteners is configured to couple a second bracket to the frame while the continuous track is received by the frame.

8. A work vehicle comprising:
a frame having two opposed compartments, wherein each compartment of the two opposed compartments is configured to receive a lubricating liquid to provide lubrication to a respective chain drive powered by a hydraulic motor, the hydraulic motor includes a first drive gear and a second drive gear, and the chain drive is usable to drivingly move a continuous track or a set of wheels to move the work vehicle; and
fluid lines to the hydraulic motor remaining interior of the frame when either of the continuous track or the set of wheels is received by the frame;
wherein the continuous track and the set of wheels are interchangeably receivable by the frame, and the frame remains virtually identical whether receiving the continuous track or the set of wheels;
wherein a first chain of the respective chain drive extends between the first drive gear and a first sprocket coupled to a first wheel drive axle positioned proximate to a first longitudinal end of the frame, and a second chain of the respective chain drive extends between the second drive gear and a second sprocket coupled to a second wheel drive axle positioned proximate to a second longitudinal end of the frame, opposite the first longitudinal end of the frame, while the set of wheels is received by the frame; and
wherein at least one chain of the respective chain drive extends between the first drive gear and a third sprocket coupled to a track drive axle positioned proximate to the first longitudinal end of the frame, and the at least one chain of the respective chain drive extends between the second drive gear and a fourth sprocket coupled to the track drive axle, while the continuous track is received by the frame.

9. The work vehicle of claim 8, wherein the at least one chain of the respective chain drive comprises the first chain and the second chain.

10. The work vehicle of claim 8, wherein the first, second, third, and fourth sprockets are substantially identical to one another.

11. The work vehicle of claim 8, comprising a first plurality of fasteners extending laterally outwardly from a lateral side of the frame proximate to the first longitudinal end of the frame, and a second plurality of fasteners extending laterally outwardly from the lateral side of the frame proximate to the second longitudinal end of the frame;
wherein the first plurality of fasteners is configured to couple a first hub support to the frame while the set of wheels is received by the frame, and the second plurality of fasteners is configured to couple a second hub support to the frame while the set of wheels is received by the frame; and
wherein the first plurality of fasteners is configured to couple a first bracket to the frame while the continuous track is received by the frame, and the second plurality of fasteners is configured to couple a second bracket to the frame while the continuous track is received by the frame.

12. A work vehicle comprising:
a frame having two opposed compartments, wherein each compartment of the two opposed compartments is configured to receive a lubricating liquid to provide lubrication to a respective chain drive powered by a hydraulic motor, the hydraulic motor includes a first drive gear and a second drive gear, and the chain drive is usable to drivingly move a continuous track or a set of wheels to move the work vehicle; and fluid lines to the hydraulic motor remaining interior of the frame when either of the continuous track or the set of wheels is received by the frame, the fluid lines being identical whether the continuous track or the set of wheels is received by the frame;

wherein the continuous track and the set of wheels are interchangeably receivable by the frame, and the frame remains virtually identical whether receiving the continuous track or the set of wheels;

wherein a first chain of the respective chain drive extends between the first drive gear and a first sprocket coupled to a first wheel drive axle positioned proximate to a first longitudinal end of the frame, and a second chain of the respective chain drive extends between the second drive gear and a second sprocket coupled to a second wheel drive axle positioned proximate to a second longitudinal end of the frame, opposite the first longitudinal end of the frame, while the set of wheels is received by the frame; and wherein at least one chain of the respective chain drive extends between the first drive gear and a third sprocket coupled to a track drive axle positioned proximate to the first longitudinal end of the frame, and the at least one chain of the respective chain drive extends between the second drive gear and a fourth sprocket coupled to the track drive axle, while the continuous track is received by the frame.

13. The work vehicle of claim 12, comprising a first plurality of fasteners extending laterally outwardly from a lateral side of the frame proximate to the first longitudinal end of the frame, and a second plurality of fasteners extending laterally outwardly from the lateral side of the frame proximate to the second longitudinal end of the frame;

wherein the first plurality of fasteners is configured to couple a first hub support to the frame while the set of wheels is received by the frame, and the second plurality of fasteners is configured to couple a second hub support to the frame while the set of wheels is received by the frame; and wherein the first plurality of fasteners is configured to couple a first bracket to the frame while the continuous track is received by the frame, and the second plurality of fasteners is configured to couple a second bracket to the frame while the continuous track is received by the frame.

\* \* \* \* \*